UNITED STATES PATENT OFFICE.

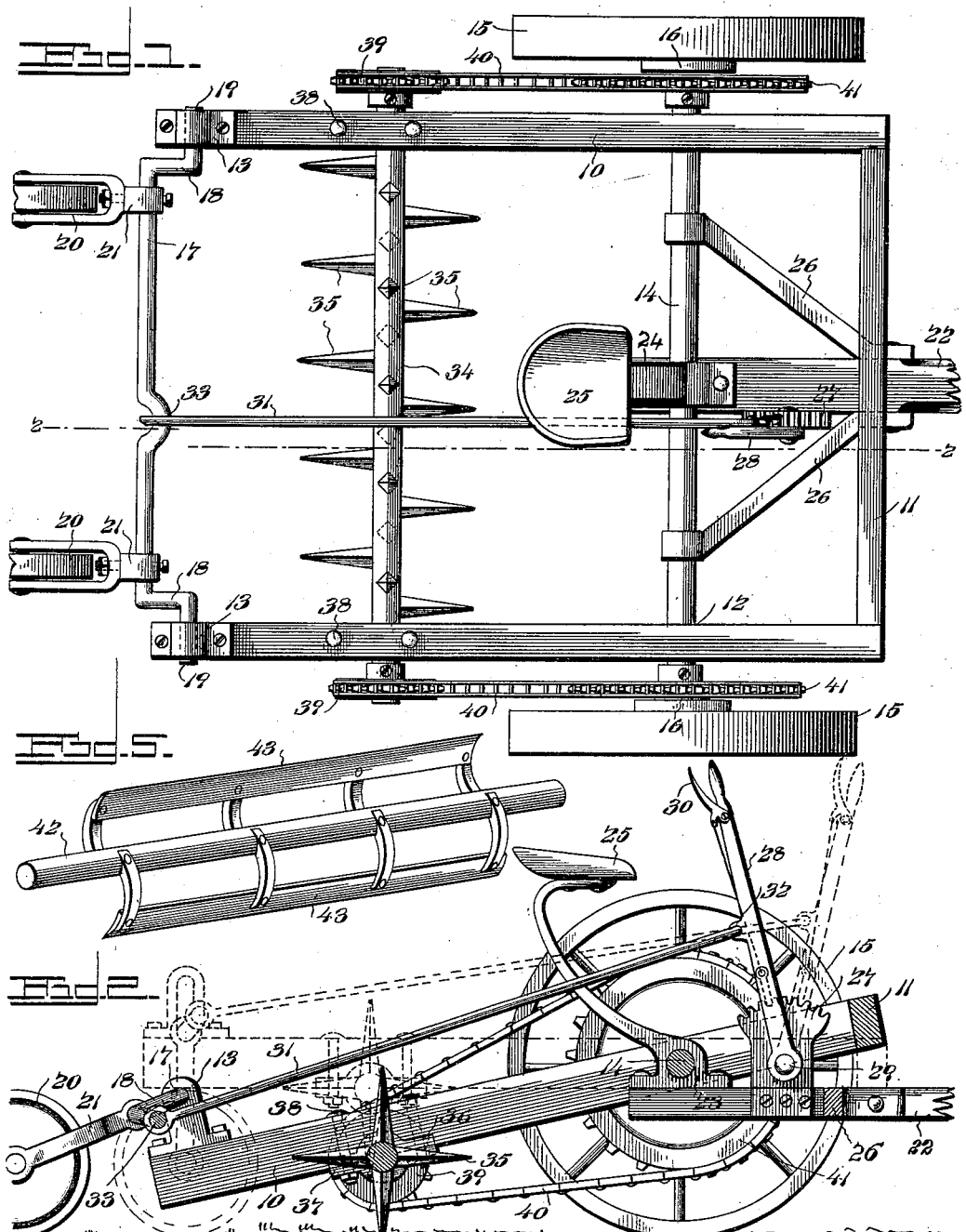

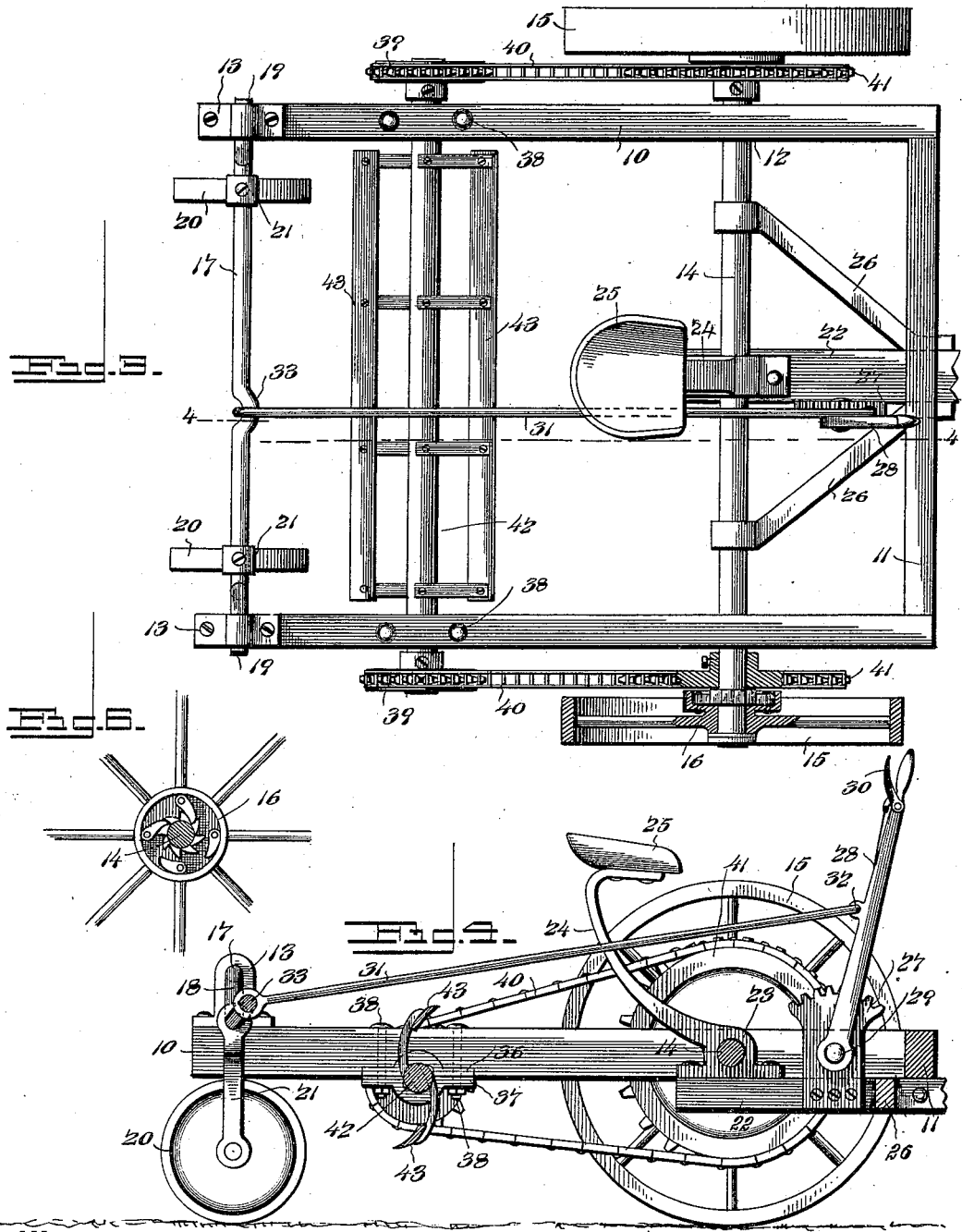

PETER F. GLASSBRENNER, OF EAST NEWBERN, ILLINOIS.

CLOD-CRUSHER.

SPECIFICATION forming part of Letters Patent No. 632,259, dated September 5, 1899.

Application filed September 3, 1898. Serial No. 690,192. (No model.)

*To all whom it may concern:*

Be it known that I, PETER F. GLASSBRENNER, a citizen of the United States, residing at East Newbern, in the county of Jersey and State of Illinois, have invented a new and useful Combined Clod-Crusher and Stalk-Cutter, of which the following is a specification.

My invention relates to improvements in combined clod-crushers and stalk-cutters; and the object that I have in view is to provide a machine which may be used for the purpose of crushing clods to prepare the ground for planting or for cutting down standing stalks in the field.

A further object of the invention is to construct the machine with means for raising and lowering the rotary shaft or cylinder to throw it into or out of an operative position when traveling to or from a field, and, furthermore, to arrange the several elements in compact relation to each other and place the adjusting-lever in a position convenient to the driver.

With these ends in view the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a plan view of my improved machine, showing it adapted for use as a clod-crusher. Fig. 2 is a vertical longitudinal sectional elevation through the machine represented by Fig. 1 and illustrating the frame and the rotary crushing-shaft lowered into operative position, the plane of section being indicated by the dotted line 2 2 of Fig. 1. Fig. 3 is a plan view illustrating the machine equipped with a rotary cutter-cylinder for the purpose of chopping down standing stalks in a field. Fig. 4 is a longitudinal section of the machine illustrated by Fig. 3, but showing the frame and the rotary shaft or cylinder in their raised positions, the plane of section being indicated by the dotted line 4 4 of Fig. 3. Fig. 5 is a detail perspective view of the cutter-cylinder removed from the machine. Fig. 6 is a detail sectional view illustrating the ratchet connections between the ground-wheel and the main axle, the latter serving to drive the sprocket-wheels by which the rotary shaft is driven on the advancing movement of the machine.

Like numerals of reference denote like and corresponding parts in each of the several figures of the drawings.

The carrying-frame 10 of my improved machine has its side bars arranged in parallel relation to each other and joined at the front end by a cross bar or rail 11, thus leaving the rear end of this frame open for the accommodation and adjustment of the cranked axle, presently described. On the side rails, at points intermediate of their length, are provided the axle-bearings 12 for the main axle, and at the rear ends of the frame-rails are secured the axle-bearings 13, which accommodate the journals of the adjustable cranked axle.

The main axle 14 is arranged transversely across the machine near its front end, and it is fitted in the bearings 12 of the frame 10. The ends of this main axle project from opposite sides of the frame to receive the ground-wheels 15, which are loosely mounted on said ends of the axle to turn or rotate freely thereon when the machine is moved in a backward direction; but on the forward travel of the machine these ground-wheels serve to rotate the axle through the clutch connection 16. A clutch connection is provided between each ground-wheel and the end of the axle on which the ground-wheel is mounted, and in the embodiment of the invention represented by Fig. 6 of the drawings this clutch connection is shown as consisting of a series of pawls, which are hung loosely on the hub of the ground-wheel and are arranged for engagement with the ratchet secured fast to the axle. It is evident that on the forward progress of the machine the pawls will engage with the ratchet to rotate the main axle from the ground-wheels, and thus furnish the motive power by which the rotary shaft may be driven; but backward movement of the machine obviates the rotation of said shaft, because the pawls slip idly over the ratchets and the main axle is not rotated.

The cranked axle 17 is arranged transversely across the open rear end of the carrying-frame, and said axle is equipped with the crank-arms 18, which are provided at their free ends with the journals 19, the latter being fitted loosely in the axle-bearings 13 of the frame 10. This cranked axle is adjustable by a lever mounted on the machine-frame within reach of the operator, and said axle supports the carrying-wheels 20, which are journaled in suitable hangers 21, said hangers being attached to or united with the cranked axle for adjustment therewith when the axle is rocked or turned by the lever of the carrying-frame. The carrying-wheels 20 are smaller in diameter than the ground-wheels 15 for the purpose of permitting the open rear end of the carrying-frame to be lowered when the cranked axle is elevated, and the carrying-wheels 20 are in swiveled hangers, which not only secure the adjustment of said wheels with the cranked axle, but allow the wheels to turn in order to facilitate the guidance of the machine and enable it to be conveniently turned around at the edge of the field.

22 designates a draft-tongue, which is shown in the drawings as being fastened to the front rail of the carrying-frame and as extended in rear of the main axle, and this draft-tongue and the axle are loosely connected or coupled together, as at 23, to utilize the axle for the support of the rear end of the tongue and allow said axle to rotate freely when impelled by the ground-wheels. The seat-standard 24 is secured rigidly to the rear end of the tongue, and on this standard is mounted a driver's seat 25. Braces 26 are attached to the front rail 11 of the carrying-frame and coupled to the rear axle 14 in any approved way.

Secured rigidly to one side of the tongue, at the rear end thereof and adjacent to the driver's seat, is a notched segment 27, and a lever 28 is fulcrumed at 29 on said rear end of the tongue for the thumb-controlled latch 30, which is carried by said lever, to engage with the notched segment at any point of adjustment of said lever. The lever is operatively connected to the cranked axle by a pitman or link 31, the front end of which is pivoted at 32 to the lever, and its rear end is attached at 33 to the cranked axle in a manner to turn the latter on its journals 19 when the lever is moved in a forward or backward direction to lower or raise the cranked axle and the swiveled carrying-wheels thereon.

The machine thus far described is adapted to carry a toothed crushing shaft or roll or a rotary cutter-cylinder, according as it is desired to employ the machine for crushing the clods or cutting cornstalks, and in either adaptation of the machine the shaft or the cylinder may be brought into operative relation to the ground-line by proper adjustment of the frame through the medium of the cranked axle and its controlling-lever.

In Figs. 1 and 2 of the drawings the machine is represented as being equipped with a rotary crushing shaft or roll 34, which is provided with a series of crushing-teeth 35. These crushing-teeth are preferably tapered, and they are attached or fixed to the shaft in staggered relation in order that a number of the teeth may operate on the clods as the machine advances. This crushing roll or shaft 34 is arranged on the frame in a position between and parallel to the main and the cranked axles, and said shaft or roll 34 is mounted removably in the sectional boxes 36. These boxes are applied to the under or lower edges of the frame-rails, and they are equipped with the removable caps 37, which are firmly secured in place by the bolts 38. The ends of the shaft or roll 34 project beyond the sides of the frame, and they are provided with the sprocket-wheels 39, around which pass the endless sprocket-chains 40. The driving-sprockets 41 are fixed to the main axle in line with the sprocket-wheels 39 and within the ground-wheels on the main axle, and the described sprocket-gearing serves to transmit the motion of the main axle to the shaft or roll 34 to insure positive rotation of the latter as the machine is advanced.

To adapt the machine for service in cutting down standing stalks, the crushing shaft or roll is removed from the boxes 36 by loosening the bolts 38 and the caps 37, and in lieu of this toothed shaft the machine is equipped with a rotary cylinder or shaft having a series of knives. The cutter shaft or cylinder 42 is adapted to be mounted or journaled in the boxes 36, and to it are secured the sprocket-wheels, which are impelled by the sprocket-chains that are actuated by the driving-sprockets on the main axle. This shaft or cylinder 42, as shown in Figs. 3, 4, and 5, is provided with a series of knives 43, two or more in number, and each knife has a series of arms which are secured, as by bolts, to the shaft or cylinder 42. The knives are curved or arched in cross-section, and at their free outer edges they are beveled to sharpened cutting edges. The arms and the curved blades are so disposed with relation to the shaft or cylinder 42 as to present the cutting edges of said blades on a tangent to the cylinder, and the rotary cutter is thus adapted to act on the cornstalks with a draw or shear cut, thereby severing the stalks easily and rapidly.

In the service of my machine as a clod-crusher (represented by Figs. 1 and 2) the cranked axle is adjusted to lower the machine-frame to a downwardly and rearwardly inclined position, and the machine is sustained in its adjusted position by the ground and carrying wheels on the main and cranked axles. The machine is not lowered sufficiently for the crushing roll or shaft 34 to be in contact with the ground; but this shaft is rotated positively by the gear connections with the main axle in order to actuate the teeth 35 to thoroughly break up and pulverize the clods and soil.

The operation of the machine as a stalk-cutter is similar to the clod-crusher in that the frame is lowered to present the cutter-cylinder in operative relation to the stalks, and the said cylinder is driven positively by the gear connections with the main axle, so as to sever the stalks with a draw or shear cut.

In traveling to or from the field the operator moves the lever to lower the cranked axle and raise the frame, so as to throw the crushing-roll or the cutter-cylinder out of active relation to the ground-line; but when the machine is moved in a backward direction the ground-wheels do not actuate the main axle to propel the gearing and the crushing-roll or cutter-cylinder.

My machine is simple in construction and cheap of manufacture. The cutter-cylinder and the crushing-roll may be interchangeably used on the same frame, and in either adaptation of the machine the roll or cylinder is propelled by the gear connections and is sustained by the frame out of contact with the ground.

Changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

In a combined agricultural implement, the frame open at its rear end, the axle upon which the frame is mounted and which is provided with the ground-wheels, and the sprocket-wheels 41; the chains 40, the removable boxes applied to the under side of the frame, the removable shaft 34 journaled in the removable boxes, and the removable sprocket-wheels 39 applied to the ends of the shaft 34 upon opposite sides of the frame, combined with a crank-shaft at the rear end of the frame, boxes in which the shaft is journaled, and which are applied to opposite rear corners of the frame, suitable hangers 21 rigidly secured to the shaft, carrying-wheels 20 swiveled in the hangers, the connecting-rod which is fastened to the crank-axle at 33, an operating-lever, and means for locking the lever in position, whereby the crank-shaft 17 can be turned so as to raise the lower rear end of the frame, substantially as shown and described.

In testimony that I claim the foregoing as my own I have hereto affixed my signature in the presence of two witnesses.

PETER F. GLASSBRENNER.

Witnesses:
A. TRAVIS,
GEO. L. GLASSBRENNER.